US008868671B2

(12) United States Patent
Jo et al.

(10) Patent No.: US 8,868,671 B2
(45) Date of Patent: Oct. 21, 2014

(54) METHOD FOR SELECTING A MASTER DEVICE IN A COEXISTENCE SYSTEM

(75) Inventors: Junho Jo, Anyang-si (KR); Jihyun Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 36 days.

(21) Appl. No.: 13/512,003

(22) PCT Filed: May 2, 2011

(86) PCT No.: PCT/KR2011/003264
§ 371 (c)(1),
(2), (4) Date: May 24, 2012

(87) PCT Pub. No.: WO2011/142548
PCT Pub. Date: Nov. 17, 2011

(65) Prior Publication Data
US 2013/0117402 A1 May 9, 2013

Related U.S. Application Data

(60) Provisional application No. 61/408,640, filed on Oct. 31, 2010, provisional application No. 61/380,196, filed on Sep. 3, 2010, provisional application No. 61/362,696, filed on Jul. 9, 2010, provisional application No. 61/333,272, filed on May 11, 2010.

(51) Int. Cl.
*G06F 15/16* (2006.01)
*H04W 16/14* (2009.01)
*H04L 12/24* (2006.01)
*H04W 84/20* (2009.01)
*H04W 28/04* (2009.01)

(52) U.S. Cl.
CPC ............... *H04L 41/04* (2013.01); *H04W 84/20* (2013.01); *H04W 16/14* (2013.01); *H04W 28/04* (2013.01)
USPC .......................................... 709/208; 709/209

(58) Field of Classification Search
USPC .................................................. 709/208, 209
See application file for complete search history.

(56) References Cited

U.S. PATENT DOCUMENTS

| 2005/0212687 A1* | 9/2005 | Nishikata ................. 340/825.72 |
| 2006/0190549 A1* | 8/2006 | Teramae et al. ............... 709/208 |
| 2008/0019392 A1 | 1/2008 | Lee |
| 2008/0254795 A1* | 10/2008 | Ratcliffe et al. ........... 455/435.1 |
| 2009/0089824 A1* | 4/2009 | Beyabani ........................ 725/17 |

FOREIGN PATENT DOCUMENTS

| CN | 101535977 | 9/2009 |
| KR | 10-2006-0058948 | 6/2006 |
| KR | 10-0772412 | 11/2007 |

OTHER PUBLICATIONS

The State Intellectual Property Office of the People's Republic of China Application Serial No. 201180022870.3, Office Action dated Jul. 3, 2014, 6 pages.

* cited by examiner

*Primary Examiner* — Liangche A Wang

(74) *Attorney, Agent, or Firm* — Lee, Hong, Degerman, Kang & Waimey

(57) ABSTRACT

Disclosed is a method of selecting a master device for coexistence, the method comprising: identifying devices to be used in at least one network capable of coexisting without cooperation; selecting a master device among the identified devices; and controlling, by the master device, other network and device.

8 Claims, 10 Drawing Sheets (a)　　　　　　　　　　　　(b)

FIG. 4
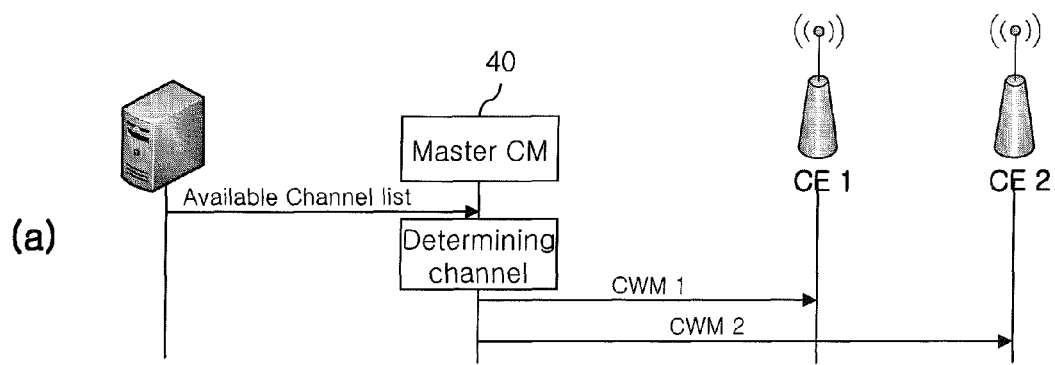
(a)
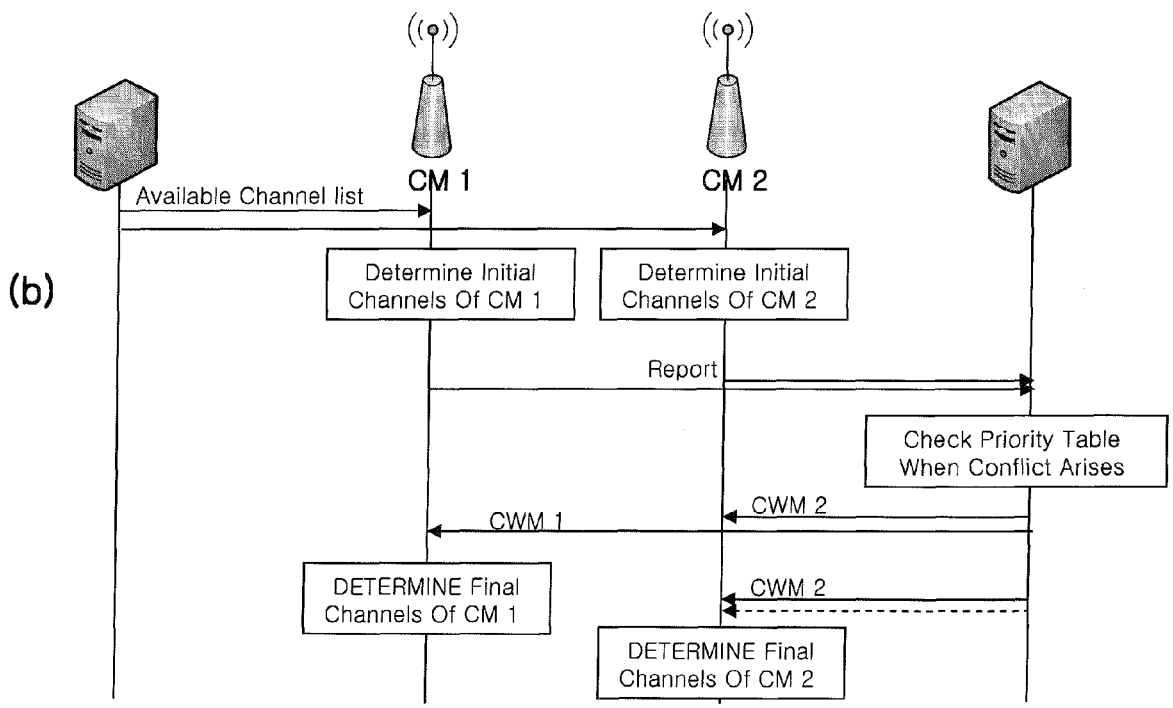
(b)

FIG. 9
(a)
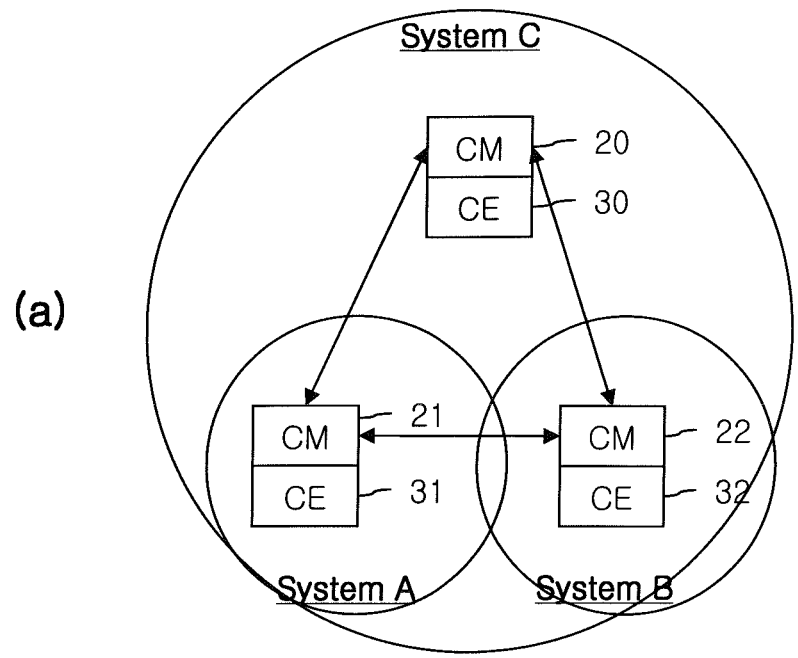
(b)
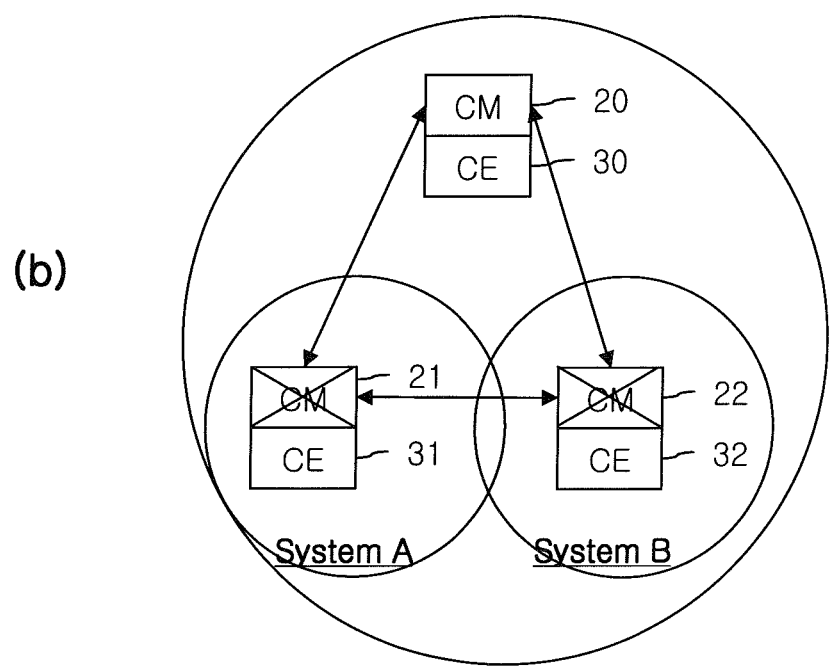

METHOD FOR SELECTING A MASTER DEVICE IN A COEXISTENCE SYSTEM

CROSS-REFERENCE TO RELATED APPLICATIONS

This application is the National Stage filing under 35 U.S.C. 371 of International Application No. PCT/KR2011/003264, filed on May 2, 2011, which claims the benefit of U.S. Provisional Application Ser. No. 61/408,640 filed on Oct. 31, 2010, U.S. Provisional Application Ser. No. 61/380,196 filed on Sep. 3, 2010, U.S. Provisional Application Ser. No. 61/362,696 filed on Jul. 9, 2010, and U.S. Provisional Application Ser. No. 61/333,272 filed on May 11, 2010, the contents of which are all hereby incorporated by reference herein in their entirety.

TECHNICAL FIELD

The present invention relates to a coexistence scheme, and particularly, to a method and device for selecting and using a master device in a coexistence scheme.

BACKGROUND ART

In accordance with predictions of dramatic increases in wireless data traffic in line with the recent vitalization of eco-systems related to the wireless Internet such as smart-phones and app stores, spectrum sharing methods have attracted attention as methods of increasing frequency supply. However, with the current spectrum management system, demand for increased frequency supply could not be met promptly and frequency supply may also be limited. That is, refarming of exiting frequencies and frequency allocation to new providers through auctions may lead to inefficient use of time. Fundamentally, it has become more difficult to ensure new frequency bands in the table of frequency allocations.

Recently, as a method of solving these problems, a spectrum sharing method has drawn attention. Apologists for spectrum sharing see that the current lack of frequencies results from existing compartment-type spectrum management and can be overcome by spectrum sharing technology though frequencies seem to lack in the table of frequency allocations. However, spectrum sharing technology is not a new concept but various schemes have been employed as one of the resource management methods in communications systems in technical aspects. For example, cellular schemes and multiple access schemes such as TDMA and CDMA that have been widely used are included herein.

As the existing spectrum sharing schemes are carried out according to the same technical standards or under the control of providers, effective interference suppression is possible. However, since distributed spectrum sharing schemes including a cognitive radio (CR) that has been recently introduced may cause tragedy of commons or harmful interference due to uncontrolled frequency use, problems arise in terms of spectrum management and existing user protection, and these schemes do not relate to the purpose of the market-based spectrum policy that becomes the current spectrum management system.

However, the apologists for spectrum sharing believe that the existing user protection from interference and the problems arising from the uncontrolled frequency use can be overcome or controlled through policy and technical means such as technical regulations or standards.

Types of spectrum sharing schemes may be classified according to sharing "methods" and sharing "subject and object." Here, specifically, sharing methods are interference avoidance schemes, and coexistence and cooperation models are considered. In terms of the sharing subject and object, types of spectrum sharing schemes can be divided into sharing among equals in which the subject and object have equal rights and primary-secondary sharing in which a primary user and a secondary user share spectrum.

First, with a model based on cooperation, separate protocols are present so that resource allocation and interference avoidance are possible through cooperation among all users. Resource allocation and interference avoidance may be carried out centrally by a base station or individually by respective users. Mobile communications systems based on CDMA or TDMA fall under the former, while ad-hoc systems fall under the latter.

On the other hand, with a model based on coexistence, each user carries out interference avoidance without resource allocation using common protocols. The currently commercialized technologies based on coexistence (or existence) may include wireless LAN and cordless phones, and overlay and underlay techniques can also be included herein. Between the above-described two models, the coexistence model passively involves resource allocation and interference control as compared to the cooperation model in terms of technology. Therefore, coexistence is likely to cause interference.

DISCLOSURE OF THE INVENTION

Therefore, an object of the present invention is to provide a method and device that performs communications while preventing interference from occurring in a coexistence scheme.

To achieve these and other advantages and in accordance with the purpose of the present invention, as embodied and broadly described herein, according to an aspect of the present invention, a method of selecting a master device for coexistence is disclosed. The method comprises identifying devices to be used in at least one network capable of coexisting without cooperation; selecting a master device among the identified devices; and controlling, by the master device, other network and device. The network includes a heterogeneous network or a homogeneous network. In the selecting step, a decision to select the master device is performed based on a centralized topology, a distributed topology, or an autonomous topology. the distributed topology includes a same level architecture or a hierarchal architecture.

The controlling includes: turning on or off other network and device; or enabling or disabling other network and device.

To achieve these and other advantages and in accordance with the purpose of the present invention, as embodied and broadly described herein, according to an aspect of the present invention, an apparatus for selecting a master device for coexistence is disclosed. The apparatus comprises a sensing unit configured to identify devices to be used in at least one network capable of coexisting without cooperation; and a controller configured to select a master device among the identified devices; and control other network and device.

ADVANTAGEOUS EFFECTS

According to a method of selecting a master device between devices being used in one or more networks that can coexist without cooperation according to an exemplary embodiment according to the present disclosure and controlling other networks and devices by the master device, the

BRIEF DESCRIPTION OF THE DRAWINGS

FIGS. 4A and 4B are conceptual views showing the differences in operation between the centralized topology and the distributed topology in the coexistence system according to the exemplary embodiment according to the present disclosure;

FIGS. 9A and 9B are exemplary views showing that various architectures can be supported between different types of CMs (coexistence managers) through enable/disable in the coexistence system according to the exemplary embodiment according to the present disclosure;

MODES FOR CARRYING OUT THE PREFERRED EMBODIMENTS

Figure 1:
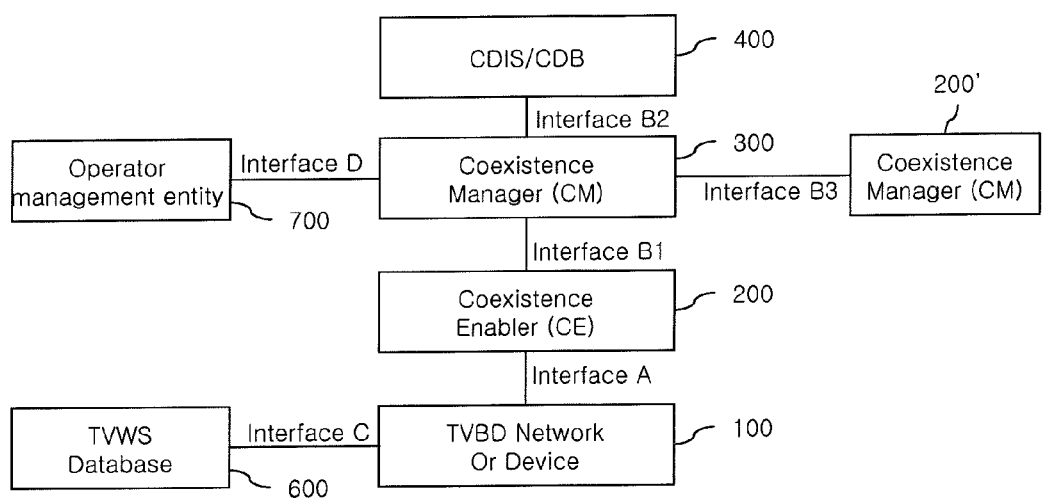
FIG. 1 is a block diagram illustrating a coexistence system according to an exemplary embodiment according to the present disclosure.

Since the present invention can be applied with various changes thereto and have various types of embodiments, specific embodiments intend to be exemplified in the drawings and minutely described in the detailed description. The invention should not be construed as being limited to the embodiments set forth herein. All such modification, equivalents, and/or substitutions, from the explicit description hereinabove, are intended to be considered as included within such spirit and/or scope of the present invention.

Also, though terms like a first and a second are used to describe various components of the present invention, the components are not limited to these terms. These terms are used only to differentiate one component from another one. For example, a component referred to as a first component in an embodiment can be referred to as a second component in another embodiment. In a similar manner, a second component can be referred to as a first component. As used herein, the term and/or includes any and all combinations of one or more of the associated listed items.

It will be understood that when an element is referred to as being "connected to" or "coupled to" another element, it can be connected or coupled to the other element or intervening elements may be present. In contrast, when an element is referred to as being "directly connected to" or "directly coupled to" another element, there are no intervening elements present.

In the following description, the technical terms are used only for explaining a specific exemplary embodiment while not limiting the present invention. The terms of a singular form may include plural forms unless referred to the contrary. The meaning of "include" or "has" specifies a property, a number, a step, a process, an operation, an element, a component, or a combination thereof but does not exclude other properties, numbers, steps, processes, operations, elements, components or combinations thereof or additions.

In addition, when terms used in this specification are not specifically defined, all the terms used in this specification including technical and scientific terms can be understood by those skilled in the art. Further, when general terms defined in the dictionaries are not specifically defined, the terms will have the normal meaning in the art. As long as clearly not defined in this application, terms will not be construed as ideally or excessively formal meanings.

Reference will now be made in detail to the preferred embodiments of the present invention, examples of which are illustrated in the accompanying drawings. The same reference numerals will be used throughout to designate the same or like components, and descriptions thereof will be omitted.

FIG. 1 is a block diagram illustrating a coexistence system according to an exemplary embodiment according to the present disclosure. As shown in FIG. 1, a coexistence system, that is, the 802.19 system architecture has three logical entities and six logical interfaces.

The three logical entities are defined as a coexistence manager (CM) 20, a coexistence enabler (CE) 30, and a coexistence database (CD) or a coexistence discovery and information server (CDIS) 10 by their functional roles. The six logical interfaces are defined as an interface A, an interface B1, an interface B2, an interface B3, an interface C, and an interface D by interfaces with other 802.19.1 logical entities.

Additionally, the 802.19 system interacts with external elements including a TV Whites Space (TVWS) database 200, a television band device (TVBD) network or device 100, and an operator management entity (OME) 300.

Here, TV white space refers to spectrum that is unused by broadcasters from VHF and UHF bandwidths for TV broadcasting. TV white space refers to unlicensed spectrum that can be used by anyone who satisfies the requirements of the government's radio regulations. Specifically, TV white space spatially means spectrum set aside due to concerns over frequency interference between broadcasters and spectrum that is unused locally or an area that broadcast waves cannot reach, and temporally means broadcast spectrum that is unused at the dawn when broadcasters do not transmit broadcast.

TV white space devices should not disrupt reception by interfering with TV viewers, who are clients of broadcasters, and affect wireless microphone devices that use part of this spectrum and perform communications at low power. To meet these requirements, TV white space devices need the following techniques.

TV white space devices may require spectrum sensing techniques of identifying TV channels in use to protect broadcast channels, a database including location-based TV channel information and access protocol techniques, coexistence techniques between different types of devices using TVWS band, intelligent autonomous wireless access element techniques for variable wireless channels, and subscriber authentication for wireless channel protection, and security techniques for user protection. In the present invention, among these techniques, coexistence techniques between the same or different types of devices (or equipment) will be described in detail.

The CE 30 may request and acquire information required for coexistence from the TVBD (TeleVision Band Device) network or device 100, translate reconfiguration requests/commands and control information received from the CM 20 into TVBD-specific reconfiguration requests/commands, and send them to the TVBD network or device 100. Here, a TVBD refers to a terminal that allows the use of TV white space according to the Federal Communication Commission (FCC).

The CM 20 has functions such as searching other CMs in order to solve coexistence problems between TVBD networks, coexistence decision making including generating and providing coexistence requests/commands and control information corresponding to the CE 30, and supporting exchange of information required for coexistence between CMs (which may include hierarchical or peer-to-peer decision making when it comes to arranging the CMs).

In addition, the CM 20 may also have functions such as sharing information between a plurality of CMs to select a master CM, generating coexistence white space map in order to efficiently share frequency resources between other networks and systems each of which has a distributed topology, and adjusting networks when performing management related to TVWS coexistence.

The CM 20 may be embedded in a device such as an access point (AP) or mounted outside the device. A fixed device like an AP (Access Point) may have the functions of the CM 20, and select and manage a master CM that represents a group of specific systems, providers or spatially separated devices.

At this time, the master CM may be designated by the CD (or CDIS) 10 to achieve spatial reuse between spatially separated users. Interference map between CMs necessary for resource allocation may be acquired by geo-location or by additionally using and processing neighbor information received from CMs. In the case of the same type of networks, a master CM may be selected through communications therebetween. In the case of different types of networks, a master CM may be negotiated via the CD (or CDIS) 10.

The CM 20 may have a hierarchical CM architecture according to coverage or specific classification criteria. With reference to white space map acquired from the CD (or CDIS) 10, a CM of the uppermost layer selects resources in consideration of its lower layer, and a lower-layer CM selects the rest of resources in consideration of its lower layer, which may be repeated.

In the case of small networks with small coverage/power, a primary user is relatively unlikely to be detected, and thus, more available TVWS channels are present. Therefore, a small network compares its own WM (White space Map) with WM (White space Map) of a different type of neighbor network through the CM 20, and selects and uses channels first that the neighbor network cannot use. This may be controlled by the CDIS 11, the CDB 12 or the CD 10, or carried out in reverse order from a small network.

The CD (Coexistence Database) 10 may be shown as a CDIS or a CDB according to functions. The CD (or CDIS) 10 may have functions such as generating coexistence white space map having a centralized topology to efficiently share frequency resources between other networks and systems, controlling a plurality of operators when performing management related to TVWS coexistence, and selecting a master CM to reduce communication overhead between CMs and solve coexistence problems.

In addition, the CD 10 may perform functions such as calculating coexistence contour to discover neighboring networks/systems, redirecting resources (C-MAP) according to the TVBD in order to solve coexistence problems, promoting the opening of the interfaces between CMs to support discovery of the CMs, and collecting, aggregating, and providing information to promote coexistence.

The CD 10 may omnipotently distribute resources in terms of resource allocation, present priority rules between CMs and control resource selection of the CMs as an intermediary, or serve as an information sharing medium between the CMs and external or different types of networks as a CM DB (DataBase).

As shown in FIG. 1, the interfaces may be divided into three groups: the interface B1, the interface B2, and the interface B3, which are interfaces between 802.19.1 entities; the interface A, which is an interface between the 802.19.1 entity and the TVBD network/device; and the interface C and the interface D, which are interfaces between the 802.19.1 entity and the TVWS database or the OME. Other interfaces in each group are divided according to their using methods, types of information being exchanged, and underlying protocols.

The interface A is an interface between the CE 30 and the TVBD network or device 100. The TVBD network or device 100 may provide information required for coexistence, configuration/information requests for coexistence, configuration/measurement/information responses for coexistence, and other information as needed. Configuration requests/commands and control information (corresponding to the coexistence requests/commands and the control information received from the CM), requests/commands related to control of measurements performed by the TVBD network or device 100, information indicating available resources, and other information as needed may be provided from the CE 30 to the TVBD network or device 100.

The interface B1 is an interface between the CE 30 and the CM 20. Information required for coexistence (information obtained from the TVBD network or device 100) and other information as needed may be provided from the CE 30 to the CM 20. Coexistence requests/commands and control information and other information as needed may be provided from the CM 20 to the CE 30.

The interface B2 is an interface between the CM 20 and the CD (or CDIS) 10. Information required for coexistence map, information required for neighbor set, information required for register/unenrolled, information required for discovery (obtained by the CM currently being used), information required for coexistence (obtained by the CM currently being used), and other information as needed may be provided from the CM 20 to the CD (or CDIS) 10.

Information notified for coexistence map, information notified for neighbor set, information notified for a master CM, information for discovery (obtained by other CMs), information required for coexistence (obtained by other CMs), and other information may be provided from the CD (or CDIS) 10 to the CM 20.

The interface B3 is an interface between the CM 20 and the CM 21. Information and messages for discovery and coexistence, information notified for register/unresgister (from a CM to the master CM or a CM of a device to a CM of a server), information notified for coexistence (from a CM to a master CM or from a CM of a device to a CM of a server) and other information may be provided from the CM 20 to the CM 21.

The interface C is an interface between the TVBD device 100 and the TVWS database 200. Information notified for available channels may be provided from the TVWS DB 200 to the TVBD device 100.

The interface D is an interface between the CM 20 and the OME (Operator Management Entity) 300. Network operation information related to information (for example, spectrum policy/limitations concerning operation of networks) and other information as needed may be provided from the OME 300 to the CM 20.

The coexistence system as shown in FIG. 1 may have various topologies: centralized, distributed, and autonomous topologies. In the present invention, coexistence systems that have centralized and distributed topologies will be described in detail.

Figure 2:
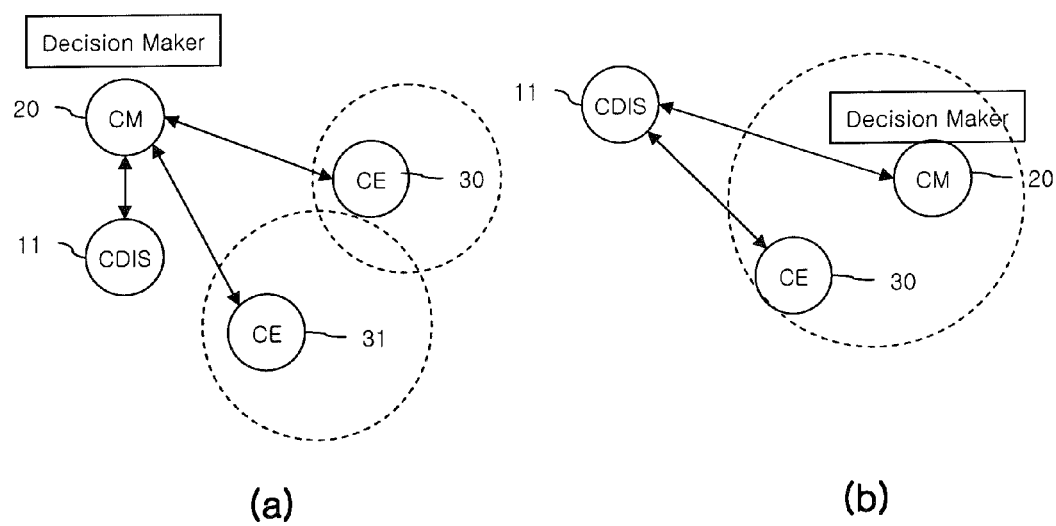
FIG. 2 is a conceptual view illustrating a method of selecting a master CM (coexistence manager) in a coexistence system having a centralized topology according to an exemplary embodiment according to the present disclosure.

FIG. 2 is a conceptual view illustrating a method of selecting a master CM (coexistence manager) in a coexistence system having a centralized topology according to an exemplary embodiment according to the present disclosure. As shown in FIG. 2, in the coexistence system that has the centralized topology, the CDIS 11 chiefly performs data storage and data processing, and the CM 20 serves as a decision maker. In particular, the CM (or master CM) 20 may control all the networks or other terminals. Here, in terms of the CM (or master CM) 20, one of the TVBDs (TV Band Devices) interfacing with networks may become the CM (or master CM) 20.

FIGS. 3A and 3B are conceptual views illustrating a method of selecting a master CM (coexistence manager) in a coexistence system having a distributed topology according to an exemplary embodiment according to the present disclosure. As shown in FIGS. 3A and 3B, in the coexistence system that has the distributed topology, the CDIS 11 or the CDB 12 promotes the opening of the interfaces between the CMs, and the CM 20 exchanges information required for coexistence. The CM 20 may carry out hierarchical or peer-to-peer decision making.

The coexistence system may determine a master CM by decision making through negotiation between the CMs through the interface (or interface B3) as shown in FIG. 3A or may make a decision or determine a master CM as the CM 20 requests the CDIS 11 or the CDB 12 to arbitrate through the interface (or interface B2) as shown in FIG. 3B.

FIGS. 4A and 4B are conceptual views to show differences in operation between the centralized topology and the distributed topology in the coexistence system according to the exemplary embodiment according to the present disclosure. As shown in FIG. 4A, in the coexistence system having the centralized topology, a representative (master or super) CM 40 may allocate individual channels to other CMs (or CEs). Here, CWM (Coexistence White space Map) may be used to show channels to be used.

As shown in FIG. 4B, in the coexistence system that has the distributed topology, CMs (for example, CM 1 and CM 2) may be classified and given priority according to predetermined criteria or policy. The CM 20 may report/send priority information about available channels to the CDB (Coexistence Database)/CDIS or other CMs. Here, CWM (Coexistence White space Map) may be used as available channels for the CMs to select.

System requirements for decision making as shown in FIGS. 4A and 4B are as follows. The 802.19.1 system needs to be able to analyze acquired information, implement coexistence decisions, and support various topology models. Here, regardless of topology models, information may include bandwidth of each TVWS network or device, available channel list that is can be known from the TVWS network/device, power limitation with respect to each TVWS channel, regulations, system parameters, or pre-analyzed neighbor information.

Figure 3:
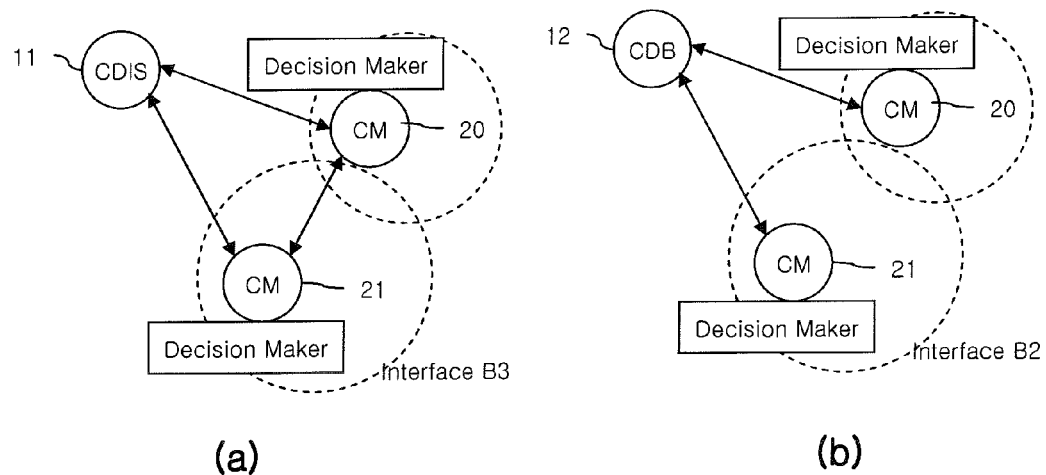
FIGS. 3A and 3B are conceptual views illustrating a method of selecting a master CM (coexistence manager) in a coexistence system having a distributed topology according to an exemplary embodiment according to the present disclosure.
Figure 5:
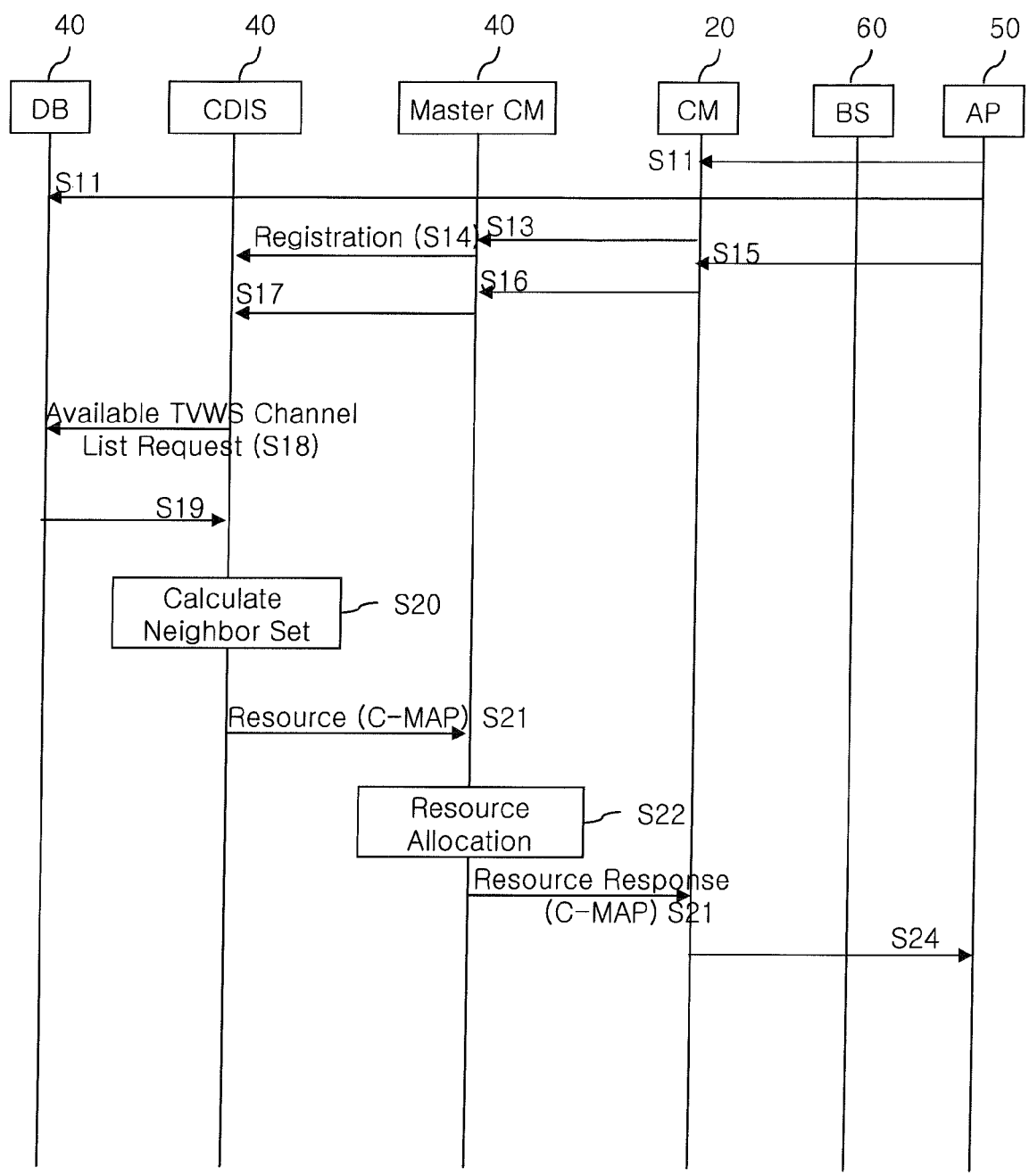
FIG. 5 is a signal flow diagram showing how resources are allocated by a master CM (coexistence manager) in the coexistence system having the centralized topology according to an exemplary embodiment according to the present disclosure.
Figure 6:
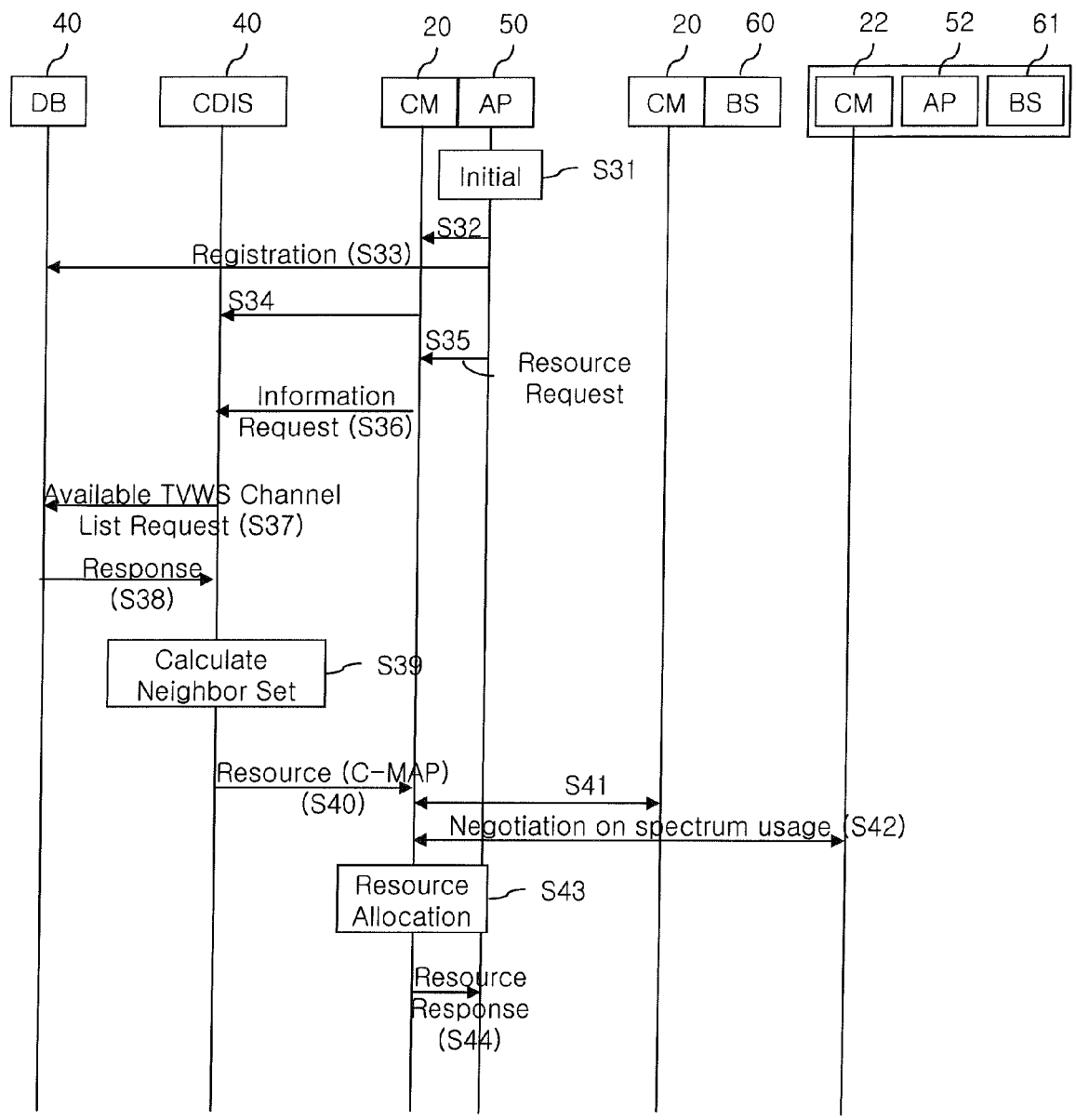
FIG. 6 is a signal flow diagram showing how resources are allocated by a master CM (coexistence manager) in the coexistence system having the distributed topology according to an exemplary embodiment according to the present disclosure.

FIGS. 5 and 6 are signal flow diagrams illustrating a method of allocating resources by a master CM (coexistence manager) or a master device in the coexistence systems having the centralized topology and the distributed topology as shown in FIGS. 2 to 4.

FIG. 5 is a signal flow diagram illustrating how a master CM (coexistence manager) allocates resources in the coexistence system having the centralized topology according to the exemplary embodiment according to the present disclosure.

As shown in FIG. 5, according to a method of allocating resources by the master CM 40 in a single centralized topology, an AP 50 requests resources in operations S15 to S17, the CDIS 11 acquires available channel list from the TVBD 100 and informs the master CM 40 of the available channel list in operations S8 to S11, and the master CM 40 allocates resources to the CM 20 in operations S12 to S14.

A process in which resources are allocated by the master CM in the centralized topology will now be described in detail with reference to FIG. 5.

When the AP 50 is registered to the TVBD 100 and the CM 20 in operations S11 to S13, the CM 20 is registered to the master CM 40 in operation S14, and the master CM 40 is registered to the CDIS 11 in operation S15. When the AP 50 requests resources through a resource request Resource (C-MAP) REQ from the CM 20 in operation S15, the CM 20 requests neighbor list and information about C-MAP from the master CM 40 in operation S16, and the master CM 40 requests the neighbor list and the information about the C-MAP from the CDIS 11 in operation S17.

The CDIS 11 requests available TVWS channel list request (REQ) from the TVBD in operation S18 and receives a response to the request in operation S19, and calculates neighbor or neighbor set and C-MAP of the CM 20 in operation S20. The CDIS 11 informs the master CM 40 of the results obtained in operation S20, that is, the neighbor list and/or C-MAP of the CM 20 in operation S21. The master CM 40 allocates resources (C-MAP) to the CM 20 in operations S22 to S23, and the CM 20 informs the AP 50 of the C-MAP in operation S24.

FIG. 6 is a signal flow diagram illustrating how a master CM (coexistence manager) allocates resources in the coexistence system having the distributed topology according to the exemplary embodiment according to the present disclosure.

As shown in FIG. 6, according to a method of allocating resources by the master CM 40 in a single distributed topology, the AP 50 requests resources in operations S 35 to S37, the CDIS 11 obtains available channel list from the TVBD 100 and indicates the CM 20 of the available channel list in operations S37 to S40, and the CM 20 negotiates with other CMs (for example, the CM 21 and a CM 22) for resources in operations S41 and S42.

A process in which resources are allocated by the master CM 40 in the distributed topology will now be described in detail with reference to FIG. 6.

When the AP 50 is registered to the TVBD 100 and the CM 20 in operations S31 to S33, the CM 20 is registered to the CDIS 11 in operation S34. When the AP 50 requests resources from the CM 20 through a resource request Resource request (REQ) in operation S35, the CM 20 requests neighbor list information and C-MAP from the CDIS 11 in operation S36.

The CDIS 11 requests available TVWS channel list request (REQ) from the TVBD 100 in operation S37 and receives a response to the request in operation S38, and calculates neighbor set and C-MAP of the CM 20 in operation S39. The CDIS 11 informs the CM 20 of the results obtained in operation S39, that is, the neighbor list and the C-MAP of CMs in operation S40, and the CM 20 negotiates with other CMs (for example, the CM 21 and the CM 22) for resources in operation S41 and S42 and reallocates resources (C-MAP) to the AP 50 in operation S43 and S44.

Figure 7:
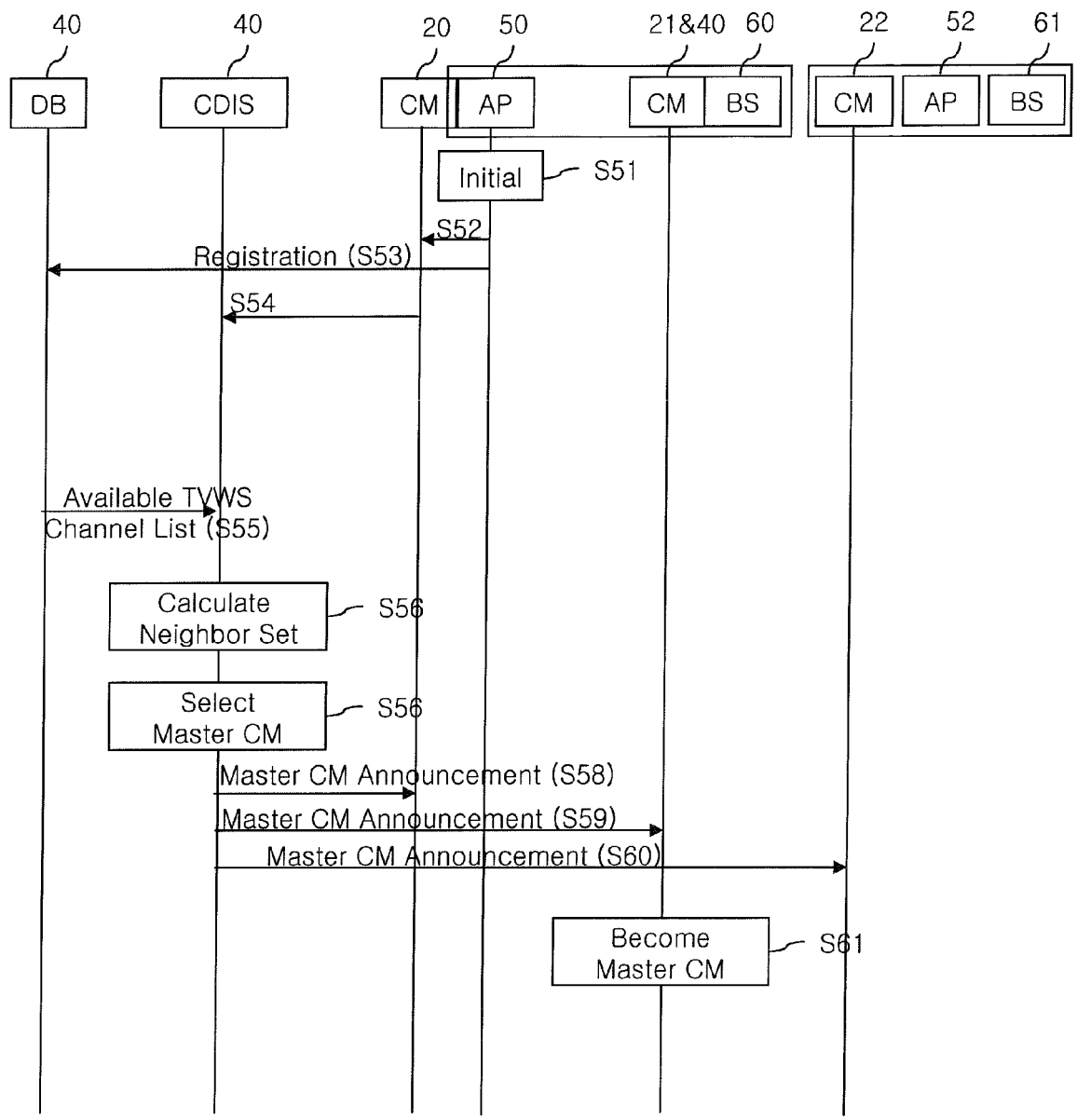
FIG. 7 is a signal flow diagram a method of selecting a master CM (coexistence manager) in a coexistence system having a centralized topology according to an exemplary embodiment according to the present disclosure.
Figure 8:
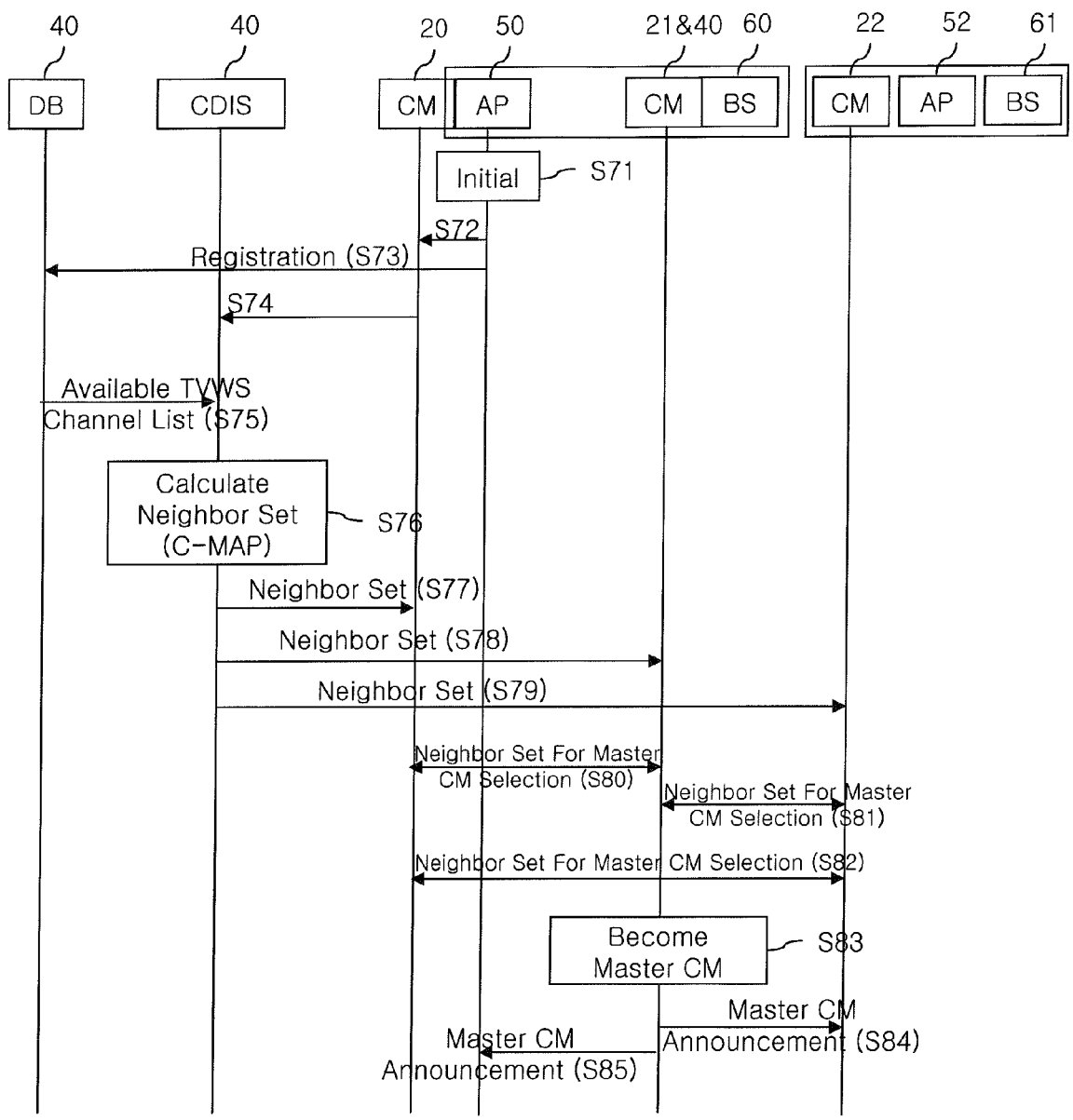
FIG. 8 is a signal flow diagram illustrating a method of selecting a master CM (coexistence manager) in a coexistence system having a distributed topology according to an exemplary embodiment according to the present disclosure.

FIGS. 7 and 8 are signal flow diagrams illustrating a method of selecting a master CM (or master device) in the coexistence systems having the centralized topology and the distributed topology described in connection with FIGS. 2 to 4.

FIG. 7 is a signal flow diagram a method of selecting a master CM (coexistence manager) in the coexistence system having the centralized topology according to the exemplary embodiment according to the present disclosure.

As shown in FIG. 7, according to the method of selecting the master CM 40 in the centralized topology, the CDIS 11 receives TV channel lists from the TVBD 100 in operation S55, the CDIS 11 calculates neighbor and C-MAP of the CMs and selects the master CM 40 of the CMs in operation S56 and S57, and the CDIS 11 informs the other CMs (for example, the CM 20 and the CM 22) of this in operation S58 to S60.

A process in which the master CM 40 is selected in the centralized topology will now be described in detail.

When the AP 50 is registered to the TVBD 100 and the CM 20 in operation S51 to S53, the CM 20 is registered to the CDIS 11 in operation S54. The CDIS 11 obtains available TV channel lists from the TVBD 100 in operation S55. Here, the TVBD 100 updates available TV channel lists at regular intervals. The CDIS 11 calculates neighbor or neighbor set and C-MAP of the CMs (for example, the CM 20 and the CM 22) in operation S56, selects the master CM 40 in operation S57, and informs the respective CMs of this in operations S58 to S60. The finally selected master CM 40 becomes a master of the AP in operation S61.

FIG. 8 is a signal flow diagram illustrating a method of selecting a master CM (coexistence manager) in the coexistence system having the distributed topology according to the exemplary embodiment according to the present disclosure.

As shown in FIG. 8, according to the method of selecting the master CM 40 in the distributed topology, the CDIS 11 receives channel lists from the TVBD 100 in operation S75, the CDIS 11 calculates neighbor and C-MAP of the CMs and informs the respective CMs of the neighbor and the C-MAP in operation S76 to S79, and the respective CMs negotiate with each other in order to select the master CM 40 or the master device in operations S80 to S82.

A process of selecting the master CM 40 in the distributed topology will now be described in detail with reference to FIG. 8.

When the AP 50 is registered to the TVBD 100 and the CM 20 in operations S71 to S73, the CM 20 is registered to the CDIS 11 in operation S74. The CDIS 11 obtains information about available TV channel lists from the TVBD 100 in operation S75. Here, the TVBD 100 updates available TV channel lists at regular intervals. The CDIS 11 calculates neighbor or neighbor set and C-MAP of the CMs in operation S76, and informs the respective CMs of neighbor lists of the CMs in operations S77 to S79. The respective CMs negotiate with each other for resources and select the master CM in operations S80 TO S82, and the selected master CM 40 becomes a master of the AP in operation S83. The selected master CM 40 informs the respective CMs of this in operations S84 and S85.

Figure 10:
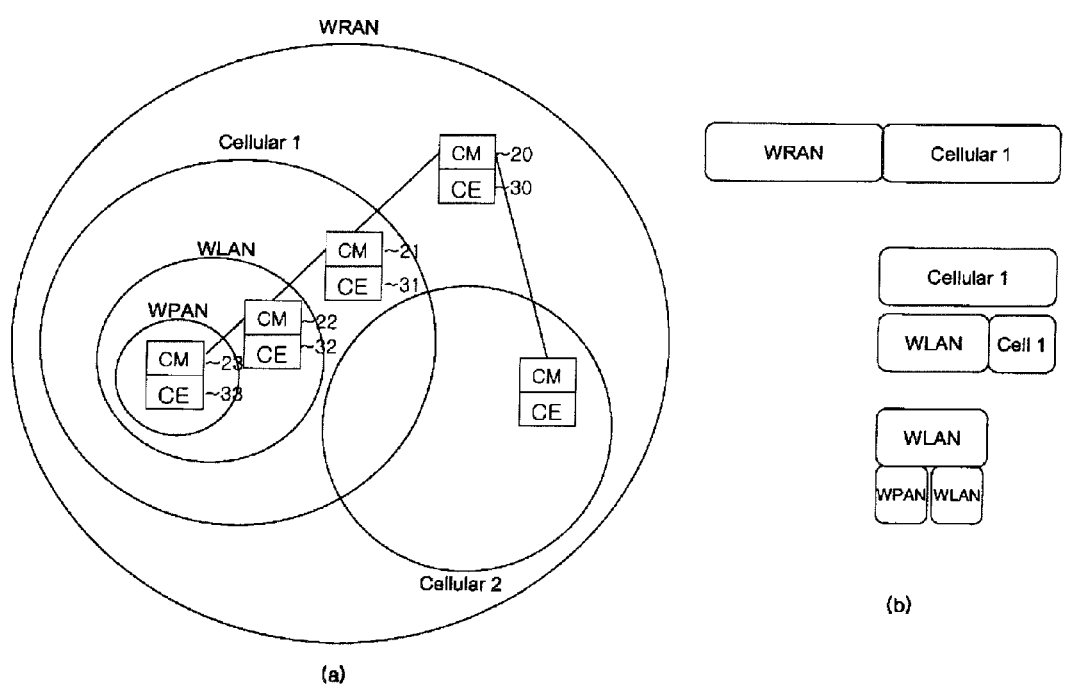
FIGS. 10A and 10B are exemplary views illustrating an example in which a hierarchical architecture is created through enable/disable between different types of CMs (coexistence managers) in the coexistence system according to the exemplary embodiment according to the present disclosure.

FIGS. 9 and 10 show that a master CM or a master device (BS, eNodeB, or MS) is selected in the same type of systems or networks that can coexist without cooperation, and networks or devices (or CM/CE of devices), instead of the master CM or the master device, are controlled, turned ON/OFF or disabled, thereby adaptively supporting various types of architectures.

FIGS. 9A and 9B are exemplary views showing that various types of architectures can be adaptively supported through enable/disable between different types of CMs (coexistence managers) in the coexistence system according to the exemplary embodiment according to the present disclosure.

As shown in FIGS. 9A and 9B, CMs in different types of systems requiring cooperation may be embodied to adaptively support various types of architectures through ON/OFF, active/inactive, or enable/disable between the CMs. When CMs in different kinds of systems (for example, system A, system B, and system C) form a peer to peer architecture as shown in FIG. 9A, a tree structure can be formed though enable/disable between the CMs such that the CM 20 that is enabled serves as a controller of the CM 21 and the CM 22 that are disabled as shown in FIG. 9B.

FIGS. 10A and 10B are exemplary views illustrating an example in which a hierarchical architecture is created through enable/disable between different types of CMs (coexistence managers) in the coexistence system according to the exemplary embodiment according to the present disclosure. As shown in FIG. 10A, a master CM is selected by ON/OFF, active/inactive, or enable/disable between CMs, thereby creating vertical relations. Thus, each CM can implement decision making with respect to networks in its horizontal layer and lower layer.

For example, as shown in FIG. 10B, a cellular system may determine a resource region of a WLAN, which is its lower layer, and its own resource region, while the WLAN may determine its own resource region and a resource region of a WPAN, which is its lower layer, with respect to resources allocated from the cellular system.

Hereinafter, the configuration and function of a terminal according to the present invention will be described.

A terminal according to the present invention may also be referred to as a device and includes any kind of terminal that can implement the exemplary embodiments of FIGS. 2 to 8. A terminal according to the present invention, that is, a device has a comprehensive meaning covering mobile communications terminals (for example, user devices (UE), mobile phones, cellular phones, DMB phones, DVB-H phones, PDA phones, and PTT phones) that can be practiced without departing from the spirit of the present invention, digital TVs, GPS navigations, portable game devices, MP3s and other home appliances. Also, a terminal according to the present invention has a comprehensive meaning covering a CM and a CE.

Hereinafter, the configuration and function of a terminal according to the present invention will be described.

A terminal according to the present invention include software that implements the exemplary embodiments of FIGS. 2 to 10 or a module having the software mounted therein. This module is one component of a terminal or a server and may be called a processor or a controller. A terminal and a server according to the present invention include hardware and software components necessary to implement the above-described technical features of the present invention.

The method according to the present invention as set forth above may be implemented in software, hardware, or some combination thereof. For example, the method according to the present invention may be stored in the storage unit of the terminal or server (for example, an internal memory of a mobile terminal, a flash memory, a hard disk, or the like), and be carried out by the processor of the terminal or the server.

Hereinafter, a device and a method according to at least one embodiment according to the present disclosure have been described with reference to the accompanying drawings. The invention may, however, be embodied in many different forms and should not be construed as being limited to the embodiments and drawings set forth herein. Various changes and modifications within the spirit and scope of the invention will become apparent to those skilled in the art from the detailed description.

The above-described method of selecting a master device in the coexistence system is not limited to the configuration and method according to the above-described exemplary embodiments, but the entirety or part of the exemplary embodiments may be selectively combined to make various modifications.

As set forth, the exemplary embodiments according to the present disclosure have been described with the accompanying drawings.

Here, the terms or words used in the present disclosure or the claims should not be construed as being limited to general meanings or dictionary definitions but should be construed as coinciding with the spirit and scope of the present disclosure.

Therefore, since the foregoing embodiments according to the present disclosure and the configurations shown in the drawings are merely exemplary and do not represent all the spirit or scope of the present disclosure, it is intended that the present invention cover modifications and variations of this invention provided they come within the scope of the appended claims and their equivalents at the time of the present application.

The invention claimed is:

1. A method for selecting a master CM (coexistence manager), the method performed by a CDIS (coexistence discover and information server) and comprising:
   receiving, by the CDIS from a first CM, a registration request including an identifier of the first CM;
   calculating, by the CDIS, neighbor information including identifiers of neighboring CMs for the first CM;
   sending the neighbor information to the first and the neighboring CMs;
   selecting, by the CDIS, the master CM among the first and the neighboring CM; and
   sending, by the CDIS, a message including an identifier of the selected master CM, to the first and the neighboring CMs,
   wherein the first and the neighboring CMs manage objects coexisting in a Television white space (TVWS) and are capable of generating a coexistence white space map, and
   wherein the master CM makes a decision on channel selections for the objects managed by the first and the neighboring CMs, and determines whether to disable the first and the neighboring CMs.

2. The method of claim 1, wherein the neighbor information is related to coexistence for IEEE 802 networks and devices and also related to non IEEE 802 networks and TVBDs (Television Band Devices).

3. The method of claim 1, wherein each of the first and the neighboring CMs is capable of at least one of:
   making coexistence decisions related to reconfiguration of a TVBD (Television Band Device) network or device; and
   exchanging information required for coexistence with CEs (coexistence enablers), the CDIS, and other CMs.

4. The method of claim 1, wherein the CDIS is capable of at least one of:
   calculating neighbor TVBD networks or devices for the first and the neighboring CMs;
   storing registration information of TVBD networks and devices;
   performing network geometry classification; or
   providing a neighbor TVBD network or device and CM information.

5. A server for selecting a master CM (coexistence manager), the sever comprising:
   a receiver configured to receive, from a first CM, a registration request including an identifier of the first CM;
   a controller configured to calculate neighbor information including identifiers of neighboring CMs for the first CM, and to select the master CM among the first and the neighboring CMs; and
   a transmitter configured to send, to the first and the neighboring CMs, the neighbor information and a message including an identifier of the selected master CM,
   wherein the first and the neighboring CMs manage objects coexisting in a Television white space (TVWS) and are capable of generating a coexistence white space map, and
   wherein the master CM makes a decision on channel selections for the objects managed by the first and the neighboring CMs, and determines whether to disable the first and the neighboring CMs.

6. The sever of claim 5, wherein the neighbor information is related to coexistence for IEEE 802 networks and devices and also related to non IEEE 802 networks and TVBDs (Television Band Devices).

7. The server of claim 5, wherein each of the first and the neighboring CMs is capable of at least one of:
   making coexistence decisions related to reconfiguration of a TVBD (Television Band Device) network or device; and
   exchanging information required for coexistence with CEs (coexistence enablers), CDIS, and other CMs.

8. The server of claim 5, wherein the CDIS is capable of at least one of:
   calculating neighbor TVBD networks or devices for the first and the neighboring CMs;
   storing registration information of TVBD networks and devices;
   performing network geometry classification; or
   providing a neighbor TVBD network or device and CM information.

* * * * *